July 3, 1951 T. R. TESIERO 2,558,887
ICE CREAM DISPENSER
Filed Nov. 1, 1948 3 Sheets-Sheet 1

Thomas R. Tesiero
INVENTOR.

BY *Clarence A. O'Brien*
and *Harvey B. Jacobson*
Attorneys

July 3, 1951  T. R. TESIERO  2,558,887
ICE CREAM DISPENSER
Filed Nov. 1, 1948  3 Sheets-Sheet 2

Thomas R. Tesiero
INVENTOR.

BY *Clarence A. O'Brien*
*and Harvey B. Jacobson*
Attorneys

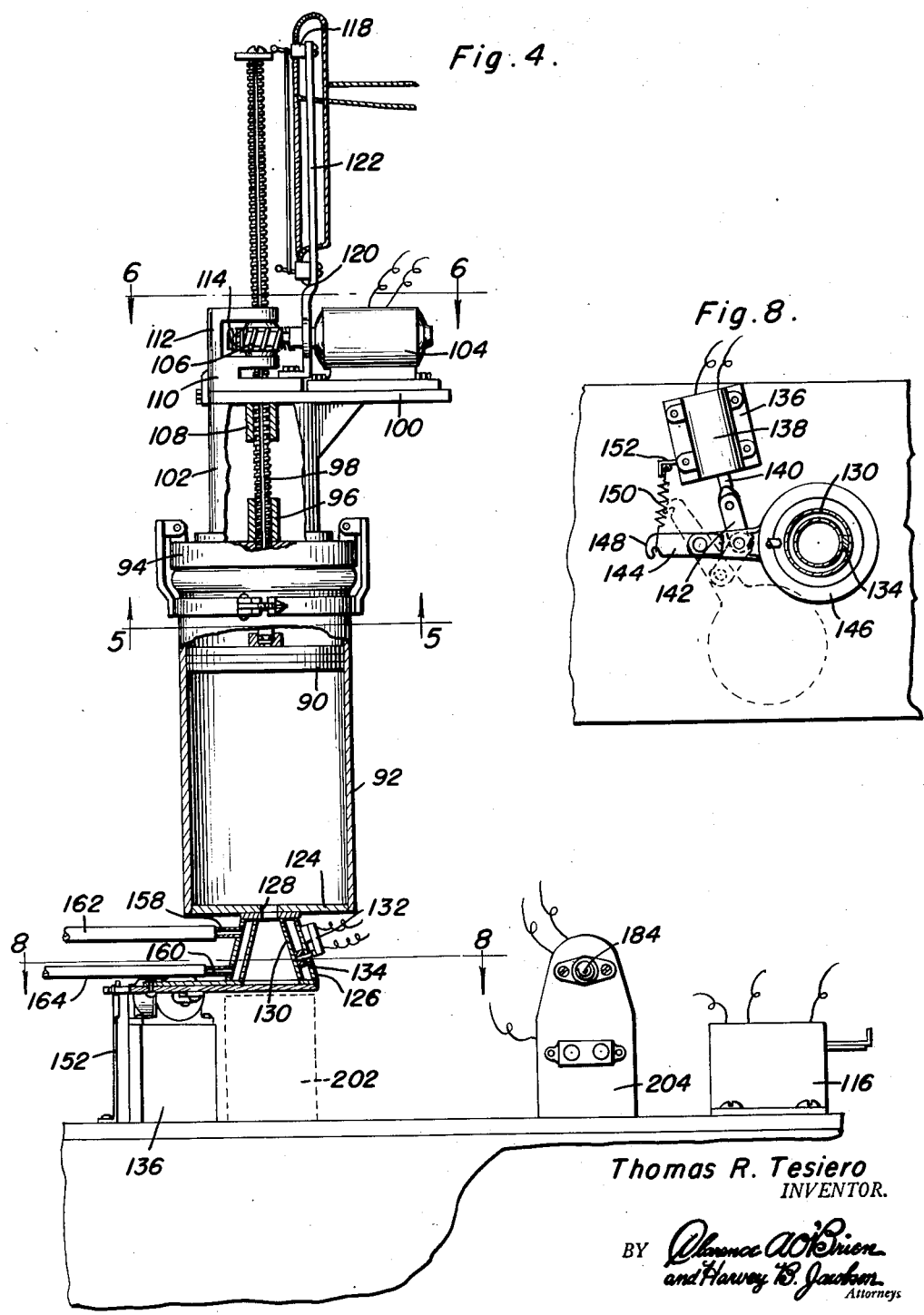

Patented July 3, 1951

2,558,887

UNITED STATES PATENT OFFICE 2,558,887

ICE-CREAM DISPENSER

Thomas R. Tesiero, Amsterdam, N. Y.

Application November 1, 1948, Serial No. 57,690

7 Claims. (Cl. 107—8)

This invention relates to new and useful improvements in dispensers and the primary object of the present invention is to provide a novel and improved dispenser for ice cream or other such pasty substances.

Another important object of the present invention is to provide an ice cream dispenser including a plunger for ejecting ice cream or the like from a container into a suitable receptacle and embodying novel and improved means for selectively actuating the plunger to eject a predetermined quantity of ice cream from the container in a sanitary manner.

A further object of the present invention is to provide an ice cream dispenser including a power operated plunger that will force a predetermined quantity of ice cream from a container into a receptacle or mold and which is so designed as to be operated by an electrical coin operated switch or a manually actuated lever whereby the same may be installed in an ice cream manufacturing or selling establishment to be operated by a patron or an attendant in a convenient manner and in a sanitary manner without the necessity of having to insert a scoop, spoon or the like into the container.

A still further aim of the present invention is to provide a dispenser for ice cream and other paste-like substances that is simple and practical in construction, strong and reliable in use, small and compact in structure, neat and attractive in appearance, relatively inexpensive to manufacture, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a side elevational view of the present invention in slightly modified form, and with parts thereof broken away and shown in section for the convenience of explanation;

Figure 1:
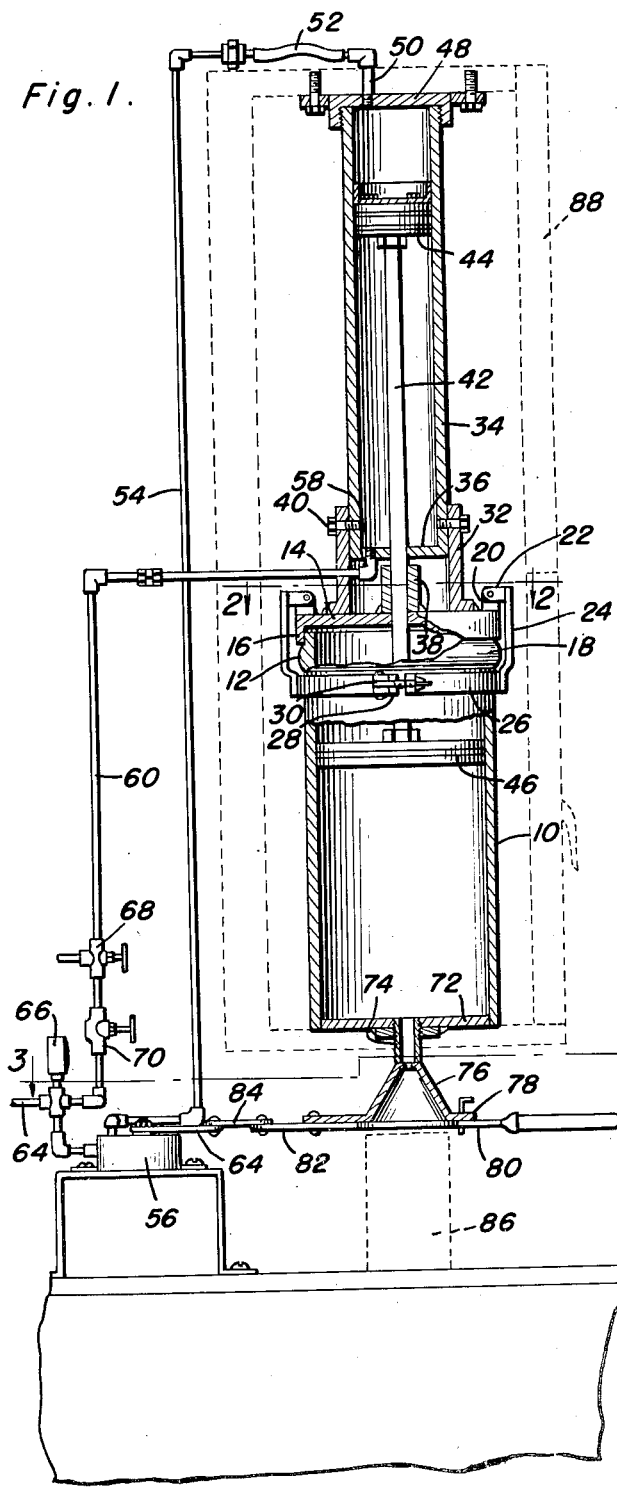
Figure 1 is a side elevational view of the present invention with parts broken away and shown in section, and with dotted lines showing a refrigerator unit and receptacle applied to the present invention in dotted lines.
Figure 2:
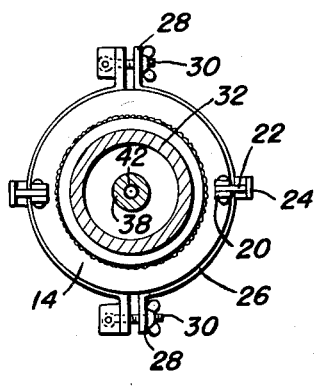
Figure 2 is a transverse horizontal sectional view taken substantially on the plane of section line 2—2 of Figure 1.
Figure 5:
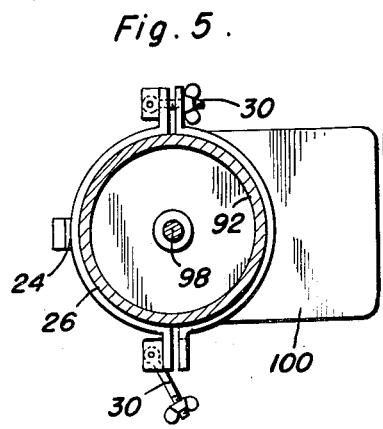
Figure 5 is a transverse horizontal sectional view of the present invention, in modified form, taken substantially on the plane of section line 5—5 of Figure 4.
Figure 3:
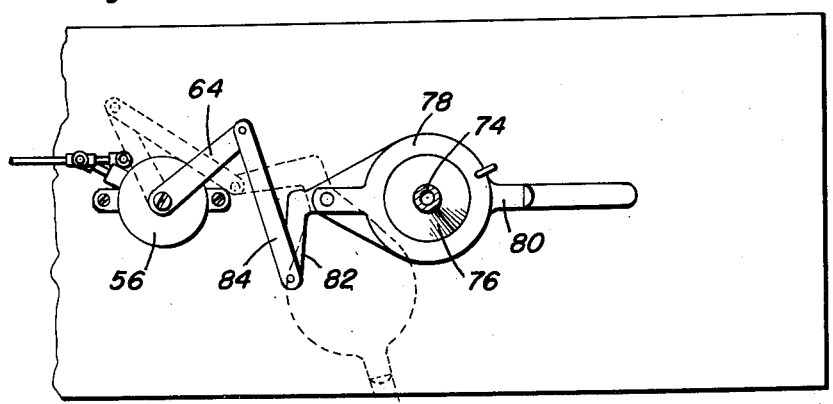
Figure 3 is a transverse horizontal sectional view taken substantially on the plane of section line 3—3 of Figure 1.
Figure 6:
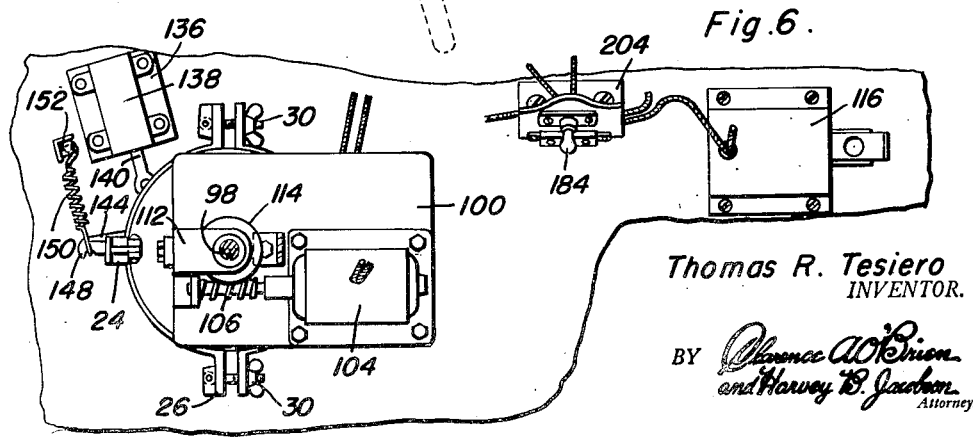
Figure 6 is a horizontal sectional view taken substantially on the plane of section line 6—6 of Figure 4.

Referring now to the drawings in detail and more particularly to Figures 1-3 inclusive, where for the purpose of illustration, there is disclosed a preferred embodiment of the present invention, the numeral 10 represents a substantially cylindrical ice cream or paste container having an annular beading 12 adjacent its upper open end.

A closure plate 14 engages the upper open end of the container 10 and includes an annular flange 16 that embraces the upper end of the container 10 and which bears against an annular beading or rib 18 that is integrally formed with the outer periphery of the container 10.

Rigidly secured to the closure plate 14 are pairs of circumferentially spaced ears 20 that pivotally engage the angulated ends 22 of hanger arms 24. The free ends of these arms 24 are secured to a pair of arcuate bands 26 having outwardly extending opposed end portions 28 that are adjustably connected to each other by fasteners 30.

Secured by welding or the like to the upper surface of the closure plate 14, is a support sleeve 32 in which there is positioned the lower end of a pressure cylinder 34 having a lower wall 36 that is formed with a central aperture that aligns with a guide sleeve 38 fixed to the closure plate 14. The cylinder 34 is removably secured to the support sleeve 32 by fasteners or the like 40.

Slidably mounted in the guide sleeve 38 and suitable apertures provided in the closure plate 14 and bottom wall 36, is a piston rod 42 the upper terminal of which removably supports an upper piston 44 that is workable in the pressure cylinder 34, and the lower terminal of which removably supports a lower piston 46 that is workable in the container 10.

The upper end of the pressure cylinder 34 is closed by a removable cap 48 that supports an air intake nipple 50 which is coupled by a flexible tube 52 to one end of an air pressure line 54. The line 54 is connected to one outlet of a three way valve housing 56.

A further inlet nipple 58 is carried by the bottom wall 36 of the pressure cylinder 34 and is coupled to a further air pressure line 60 that extends through the support sleeve 32 and which is connected to another outlet of the valve housing 56. It should be noted, that the remaining outlet of the valve housing 56 provides an atmospheric relief.

The line 60 is connected to a suitable source of compressed air such as a conventional air compressor or pump by a further line 62 and which air pressure, from the source, will also enter the housing 56 so that the valve actuating link 64 may be moved to direct air through either of the lines 54, 60 or the atmospheric relief for the housing 56.

Interposed in the line 60 is a pressure gage 66, an atmospheric relief valve 68 and a retraction valve 70.

The lower wall 72 of the container 10 is provided with a delivery tube 74 that communicates with a substantially conical and hollow mold 76 having an annular flange 78 at its major end that is secured to a handle 80. The angulated end 82 of the handle 80 is connected to the link 64 by a pitman 84 whereby a horizontal pivotal movement of the handle 80, to its dotted line position as shown in Figure 3, will actuate the link 64 for the three way valve to shut off the air pressure supply to the line 54 and divert the same into the line 60.

In practical use of the present invention as illustrated in Figures 1, 2 and 3 of the drawings, a suitable receptor or container 86 is disposed under the container 10, and the container 10, cylinder 34 and their associated parts are disposed in a conventional refrigerator 88 for ice cream with the cap 48 secured to the upper wall 90 of the refrigerator 88 by suitable fasteners.

As the handle 80 is manually moved so that the mold 76 is disposed over the container 86, pressure in the line 54 forces the piston 44 downwardly also the piston 46 downwardly to eject ice cream or the like from the container 10 through mold 76 and into the container 86. With this operation, the valve 68 is open to prevent air from binding the piston 44 within the pressure cylinder 34.

Reference is now directed to Figures 4–8 inclusive, wherein there is disclosed a modified means for actuating the plunger or piston 90 in the container 92. In this embodiment, the closure plate 94 for the container 92 is provided with an internally threaded guide sleeve 96 that receives a threaded screw 98 the lower end of which supports the piston 90.

A base plate 100 is secured to a cylindrical chamber 102 that uses from the closure plate 94 and supports a reversable electric motor 104 the drive shaft of which holds a rotary worm gear 106 that is employed for rotating the feed screw 98 in the sleeve 96 and a further internally threaded sleeve 108 depending from the base plate 100.

A support 110 is carried by the base plate 100 and includes a bifurcated portion 112 that receives a gear 114 mounted on the screw 98 and which engages the worm 106 to effect a rotary upward or downward movement of the feed screw 98 as the motor 104 is energized for rotation of the motor drive shaft in either direction.

The motor 104 is electrically connected to an automatic coin box 116 of a known and conventional type and a pair of switches 118 and 120 are mounted on a substantially vertical panel 122 carried by the support 110 for controlling the circuit to the motor 104.

Fixed to the bottom wall 124 of the container 92, is the minor end of a hollow substantially frustro-conical mold 126 that communicates with a delivery opening 128 in the bottom wall 124.

A frustro-conical diaphragm 130 of any suitable resilient material is mounted within the mold 126 and is spaced from the inner periphery of the mold 126.

A conventional and known type of micro-switch 132 is secured to the mold 126 and includes an actuating arm 134 that extends through a suitable aperture in the mold and bears against the diaphragm 130 whereby an expansion of the diaphragm 130 will actuate the arm 134 and the switch 132 will be in a circuit closing position.

Supported upon a base 136 is a solenoid 138 having a movable core 140 that is pivotally connected to a link or pitman 142 which is pivotally carried by the handle portion 144 of a trap or closure plate 146. The outer extremity of the handle portion 144 terminates in a hook 148 that engages one end of a coil spring or resilient member 150 the remaining end of which is anchored to an upright 152 for normally urging the trap 146 to a closed position under the mold 126.

A bearing plate or extension 154 projects outwardly from the mold 126 and is pivoted as at 156 to the handle portion 144 of the trap 146.

An air inlet nipple 158 is carried by the mold 126 and an air outlet nipple 160 is also carried by the mold 126. These nipples are connected to conduits or pipes 162 and 164 respectively, and the conduit 162 is in communication with a suitable source of air pressure preferably a hot air blower that will direct heated air into the mold 126 and between the mold 126 and diaphragm 130 to cause the material in the mold 126 to slip or drop therefrom.

Figure 7:
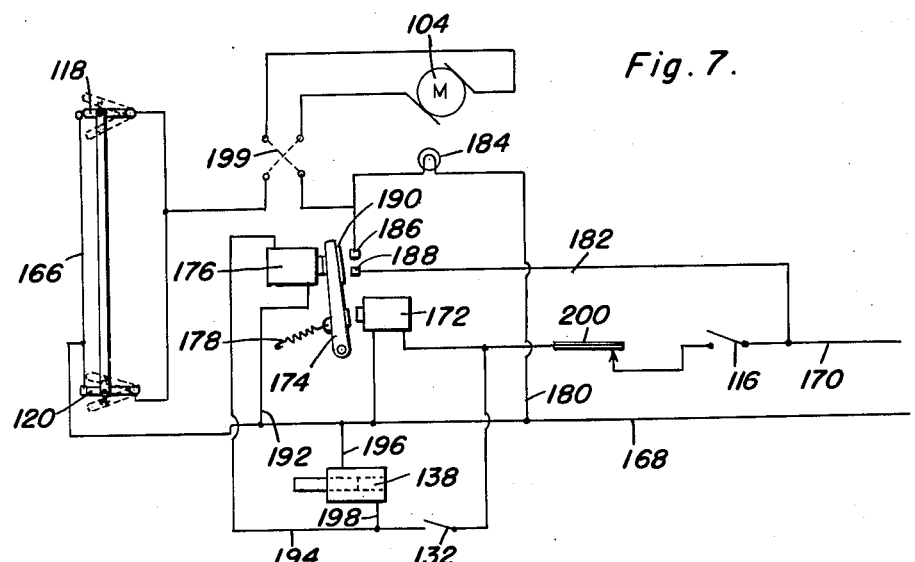
Figure 7 is a schematic diagram showing the circuit used in conjunction with the present invention in modified form, and, Figure 8 is a transverse horizontal sectional view taken substantially on the plane of section line 8—8 of Figure 4.

Reference is directed to Figure 7 illustrating the circuit diagram of the present invention.

Connected to a first conductor 166 between the switches 118 and 120 is a circuit wire 168 having a complemental circuit wire 170 that is controlled by the switch 116.

A suitable magnet 172 is suitably mounted adjacent the container 92 and its contact terminals are connected to the circuit wires 168 and 170.

Pivotally mounted relative to the magnet 172, is a magnetically attracted switch arm 174 that is adapted to be attracted by the core of the magnet 172 for movement into a circuit closing position and by the core of another magnet 176 for movement into a circuit open position.

A spring member 178 acting on the switch arm 174 normally urges the same to a circuit open position.

A pair of branch wires 180 and 182 lead from the circuit wires 168 and are connected to an indicating lamp 184. The branch wires 180 and 182 include spaced contacts 186 and 188 that engage a conductive plate 190 on the switch arm 174 when the latter is urged to a circuit closing position.

The magnet 176 is connected by conductors 192 and 194 to the circuit wires 168 and 170 and the micro-switch 132 is connected to the conductor 194.

It should be noted that the solenoid 138 is electrically connected by wires 196 and 198 to the circuit wire 168 and the conductor 194, and that the motor 104 is electrically connected to the switches 118 and 120 and to the branch line 180 and that the same is controlled by a reversal switch 199 in rotation of the worm 106 in a selected direction.

A bi-metal switch member 200 controls the circuit wire 170 and normally closes the circuit for a predetermined period of time whereupon the bi-metal switch member is flexed to break the circuit.

In practical use of the present invention, when a coin is fed into the machine 116 the switch 116 will be closed and current will enter the magnet 172, causing the conductor plate to bridge the gap between the contacts 186 and 188, thus completing the circuit to the motor 104 and energizing the bulb 184.

When the motor is in operation, the feed screw will force the member 90 into the container 92 and thereby forcing ice cream in the container 92 into the diaphragm 130 which will close the switch 132.

When the switch 132 is closed, the solenoid 138 will be actuated moving the trap 146 to an open position whereby ice cream in the diaphragm 130 will pass into the receiving container 202 disposed beneath the diaphragm 130.

The bi-metal arm 200, which is preferably mounted in the coin switch 116, will then flex breaking the circuit to the motor 104 and magnetic 172 and the switch member 174 will return to its normal position as well as the trap 146.

In case the feed screw moves downwardly sufficiently for the switch 120 to be actuated, a circuit to the magnetic 176 will be made attracting the switch 174 thereto and breaking the circuit.

In order to raise the feed screw and piston 90 to its normal position, the motor reversal switch 199 is manually actuated with the circuit to the motor 104 completed.

It is preferred that the magnets 172 and 176 as well as the switch member 174 and contacts 186 and 188 be mounted in a control box or suitable housing 204 relatively close to the container 90 or solenoid 138.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a dispenser including a container having a bottom wall including a delivery opening, a mold carried by the bottom wall of said container communicating with said delivery opening, an expansible resilient sleeve mounted in said mold and spaced laterally from the walls of the mold, a closure for said mold, means for moving said closure to an open position, means responsive to an expansion of said expansible sleeve for actuating said moving means, and means normally retaining said closure in a closed position.

2. A dispenser comprising a receptacle having an open bottom, a diaphragm mounted in said receptacle and comprising an expansible resilient peripheral wall spaced radially inwardly of the receptacle, a closure for the open bottom of said receptacle, means for moving the closure to an open position, a micro-switch carried by said receptacle and responsive to an expansion of said peripheral wall for actuating said moving means, and resilient means normally retaining said closure in a closed position.

3. The combination of claim 2 wherein said closure moving means includes a solenoid connected to a source of current and to said micro-switch, said solenoid having a movable core, and links connecting the movable core of said solenoid to said closure.

4. A dispenser comprising a receptacle having an open bottom, an expansible and resilient sleeve mounted in said receptacle, a closure for the open bottom of said receptacle, means for moving the closure to an open position, a micro-switch carried by said receptacle and responsive to an expansion of said sleeve for actuating said moving means, the walls of said receptacle being spaced laterally from the sleeve to provide an air space, means for admitting heated air to the air space, and means yieldingly urging the closure to its closed position.

5. A dispenser comprising a receptacle having an open bottom, an expansible sleeve-like resilient diaphragm received in said receptacle and spaced laterally from the walls of the receptacle, a closure for the open bottom of said receptacle, a solenoid including an operating core connected to said closure for moving the closure to an open position, means yieldingly urging the closure to a closed position, said solenoid being connected to a source of electric current, and a switch connected to said solenoid and supported solely by said receptacle and including an actuating arm positioned within the receptacle and against said diaphragm whereby expansion of said diaphragm actuates said switch to activate said solenoid to effect an opening of said closure.

6. The combination of claim 5 and conduit means attached to said receptacle for admitting heated air to the receptacle and about said diaphragm.

7. A dispenser comprising a receptacle including an expansible sleeve-like resilient member, a closure for the member, means for moving the closure to an open position, and means responsive to an expansion of said member for actuating said closure moving means.

THOMAS R. TESIERO.

REFERENCES CITED

The following references are of record in the file of this patent:

UNITED STATES PATENTS

| Number | Name | Date |
| --- | --- | --- |
| 1,197,211 | Kennedy | Sept. 5, 1916 |
| 1,289,907 | Proper | Dec. 31, 1918 |
| 1,412,727 | Walsh | Apr. 11, 1922 |
| 1,577,241 | Ajouelo et al. | Mar. 16, 1926 |
| 1,758,028 | Brown | May 13, 1930 |
| 1,799,755 | Loughridge | Apr. 7, 1931 |
| 1,837,592 | Skoverski | Dec. 22, 1931 |